(12) United States Patent
Frustaci et al.

(10) Patent No.: US 7,000,297 B2
(45) Date of Patent: Feb. 21, 2006

(54) ELECTROCHEMICAL CELL CURRENT COLLECTOR HAVING OPENINGS OF PROGRESSIVELY LARGER SIZES CONVERGING AT A TAB

(75) Inventors: Dominick Frustaci, Williamsville, NY (US); Tina Urso, East Amherst, NY (US); Gary Freitag, East Aurora, NY (US)

(73) Assignee: Wilson Greatbatch Technologies, Inc., Clarence, NY (US)

(*) Notice: Subject to any disclaimer, the term of this patent is extended or adjusted under 35 U.S.C. 154(b) by 518 days.

(21) Appl. No.: 10/306,007

(22) Filed: Nov. 27, 2002

(65) Prior Publication Data

US 2003/0104281 A1    Jun. 5, 2003

Related U.S. Application Data

(60) Provisional application No. 60/333,943, filed on Nov. 28, 2001.

(51) Int. Cl.
*B22P 13/00* (2006.01)
*H01M 4/74* (2006.01)
*H01M 4/02* (2006.01)

(52) U.S. Cl. .............................. 29/2; 429/241; 429/211
(58) Field of Classification Search ................ 429/241, 429/211, 623.1; 29/523.1, 2
See application file for complete search history.

(56) References Cited

U.S. PATENT DOCUMENTS

| | | | |
|---|---|---|---|
| 1,044,831 A | 11/1912 | Wackwitz | 429/239 |
| 1,440,354 A | 12/1922 | Hanna | 429/241 |
| 1,528,963 A | 3/1925 | Adams et al. | 429/243 |
| 2,503,970 A | 4/1950 | Rupp | 136/38 |
| 3,453,145 A | 7/1969 | Duddy | 136/46 |
| 3,490,954 A | 1/1970 | Babusci et al. | 136/168 |
| 3,989,539 A | 11/1976 | Grabb | 429/241 |
| 4,118,553 A | 10/1978 | Buckenthal et al. | 429/234 |
| 4,221,852 A | 9/1980 | Qureshi | 429/241 |
| 4,250,235 A | 2/1981 | DuPont et al. | 429/211 |
| 4,320,183 A | 3/1982 | Qureshi | 429/211 |
| 4,477,546 A * | 10/1984 | Wheeler et al. | 429/211 |
| 4,528,255 A | 7/1985 | Hayes et al. | 429/233 |
| 5,169,659 A | 12/1992 | Fleischmann et al. | 429/126 |
| 5,312,458 A * | 5/1994 | Muffoletto et al. | 29/623.1 |
| 5,434,019 A | 7/1995 | Zhang et al. | 429/10 |
| 5,498,496 A | 3/1996 | Sasaki et al. | 429/233 |
| 5,582,936 A | 12/1996 | Mrotek et al. | 429/241 |

(Continued)

FOREIGN PATENT DOCUMENTS

EP            58071562        10/1981

(Continued)

OTHER PUBLICATIONS

Patent Abstracts of Japan vol. 009, No. 318 (E-366), Dec. 13, 1985 & JP 60 150556 A (Nihon Denchi KK), Aug. 8, 1985.

(Continued)

*Primary Examiner*—Patrick Joseph Ryan
*Assistant Examiner*—Thomas H. Parsons
(74) *Attorney, Agent, or Firm*—Michael F. Scalise

(57) ABSTRACT

The present invention relates to a current collector for an electrochemical cell. The current collector is a substrate having a grid pattern comprising open areas converging at an imaginary focal point on a connector tab of the substrate. The openings are grouped into distinct regions with the larger openings immediately adjacent to the connector tab and the smaller openings distant there from. This provides more conductive pathways at greater distances from the tab.

28 Claims, 6 Drawing Sheets

U.S. PATENT DOCUMENTS

| | | |
|---|---|---|
| 5,989,749 A | 11/1999 | Kao et al. .................... 429/241 |
| 6,245,462 B1 | 6/2001 | Kao et al. .................... 429/241 |

FOREIGN PATENT DOCUMENTS

| | | |
|---|---|---|
| EP | 09289025 | 4/1997 |
| EP | 2002222654 | 8/2002 |
| FR | 1.010.039 | 6/1952 |
| GB | 1104093 | 2/1968 |

OTHER PUBLICATIONS

EP 0 532 313 A (Greatbatch W Ltd) Mar. 17, 1993 * figures *.

* cited by examiner

ELECTROCHEMICAL CELL CURRENT COLLECTOR HAVING OPENINGS OF PROGRESSIVELY LARGER SIZES CONVERGING AT A TAB

CROSS-REFERENCE TO RELATED APPLICATION

This application claims priority from provisional application Ser. No. 60/333,943 filed Nov. 28, 2001.

FIELD OF THE INVENTION

The present invention relates to the conversion of chemical energy to electrical energy. More particularly, the present invention relates to a current collector useful in electrochemical cells of both aqueous and non-aqueous chemistries.

BACKGROUND OF THE INVENTION

Present electrochemical cell designs primarily utilize two construction methods. Either the internal electrodes are spirally wound or they are assembled in a multiple plate or multiplate configuration. In either case, each of the positive and negative electrodes is comprised of a current collector and active chemical constituents contacted thereto. The current collector can either be the casing housing the cell or a conductive substrate, such as a foil or screen.

The current collector of the present invention comprises a substrate having a unique pattern of openings that facilitate improved discharge. The openings are larger adjacent to the current collector tab, becoming smaller as the distance from the tab increases. The present current collector is useful in both spirally wound and multiplate cell types for both primary and secondary chemistries.

SUMMARY OF THE INVENTION

Accordingly, the present invention is directed to a novel current collector design in which the open areas of the grid pattern converge at an imaginary focal point on a connector tab of the substrate. The openings are grouped into distinct regions with the larger openings immediately adjacent to the connector tab and the smaller openings distant there from. This provides more conductive pathways at greater distances from the tab so that electrode active material contacting the current collector at the smaller openings is more efficiently discharged.

These and other aspects of the present invention will become increasingly more apparent to those skilled in the art by reference to the following description and the appended drawings.

DETAILED DESCRIPTION OF THE PREFERRED EMBODIMENTS

Figure 1:
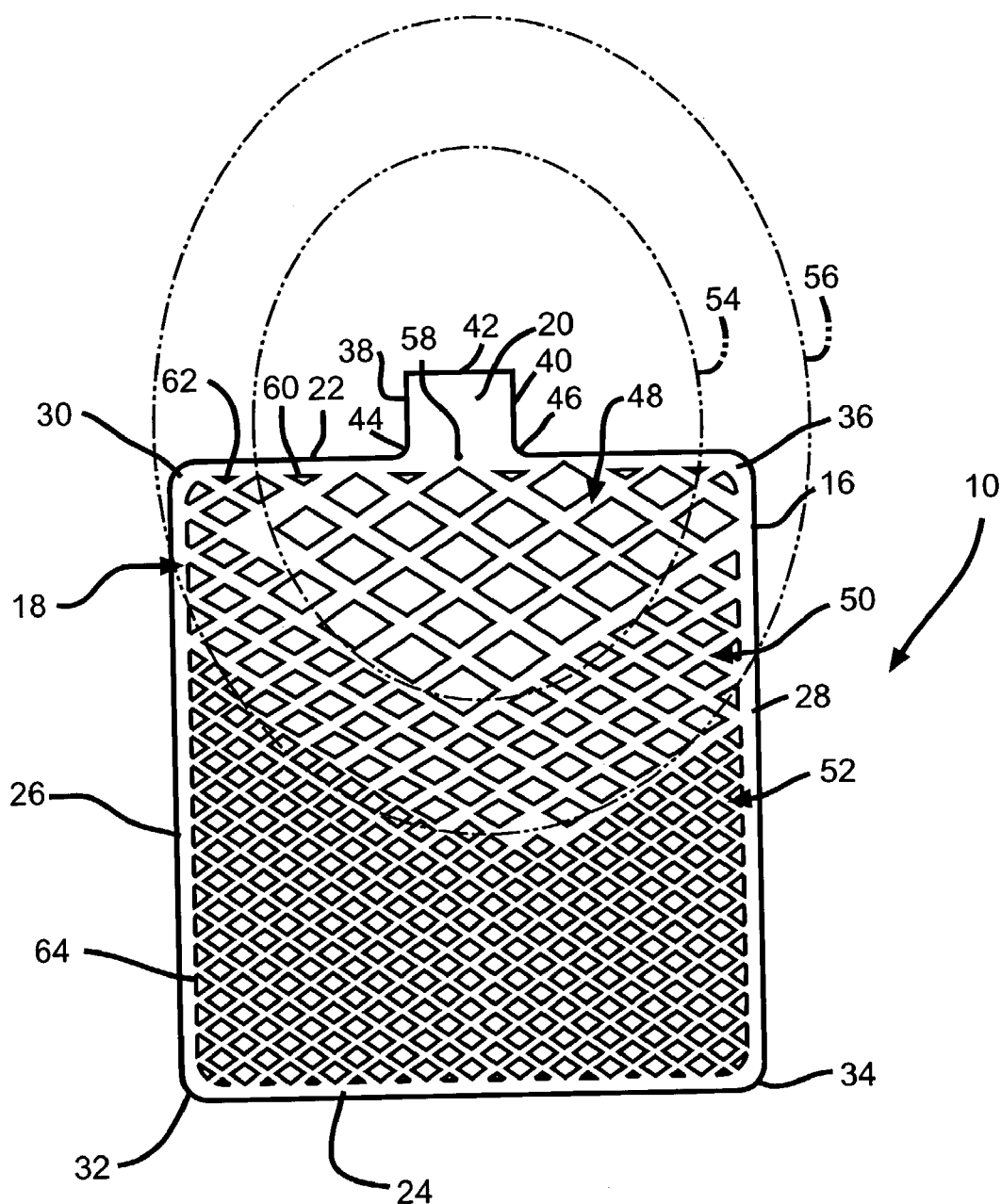
FIG. 1 is a plan view of one embodiment of a current collector 10 according to the present invention.
Figure 1A:
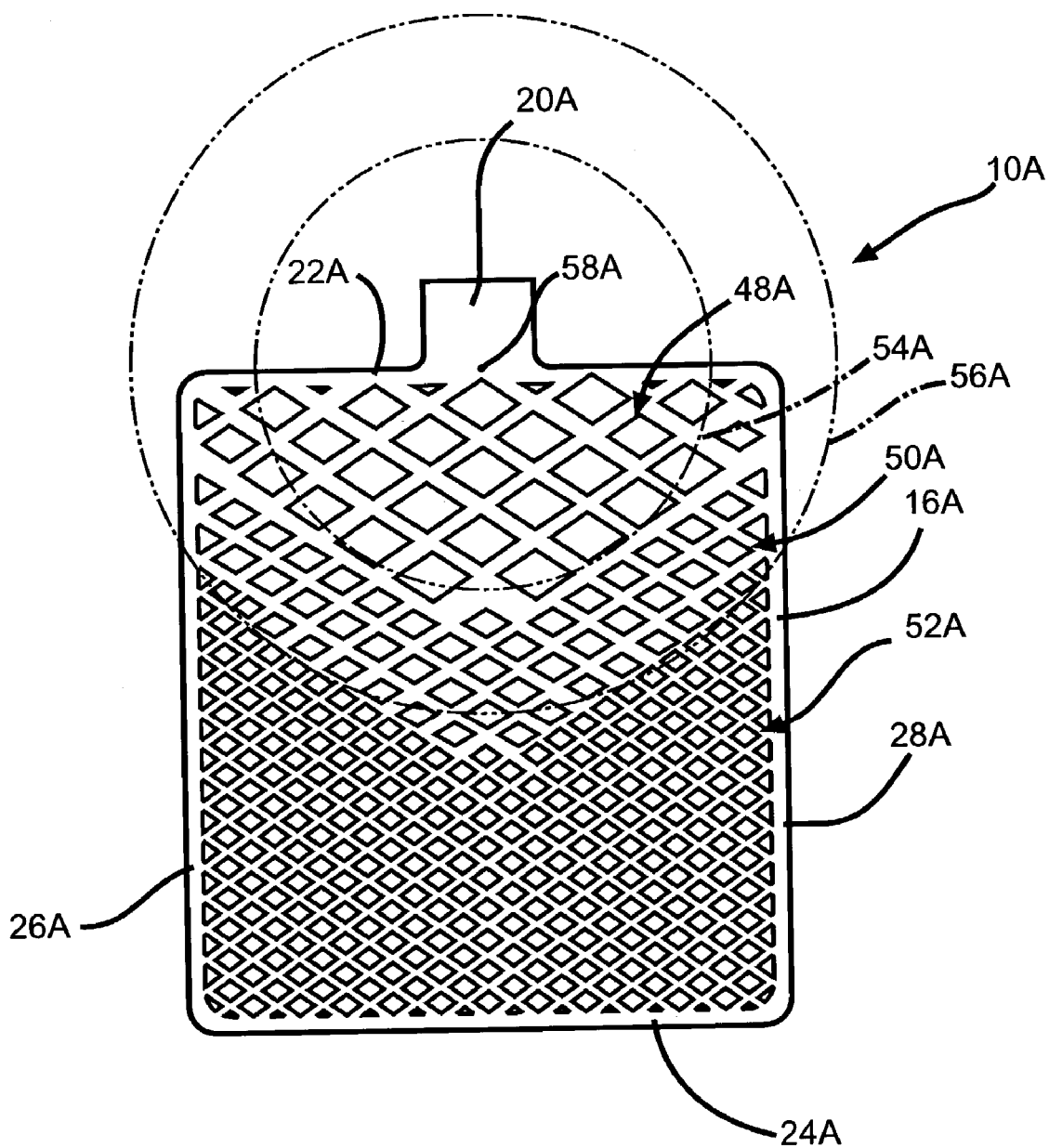
FIG. 1A is a plan view of another embodiment of a current collector 10A according to the present invention.
Figure 1B:
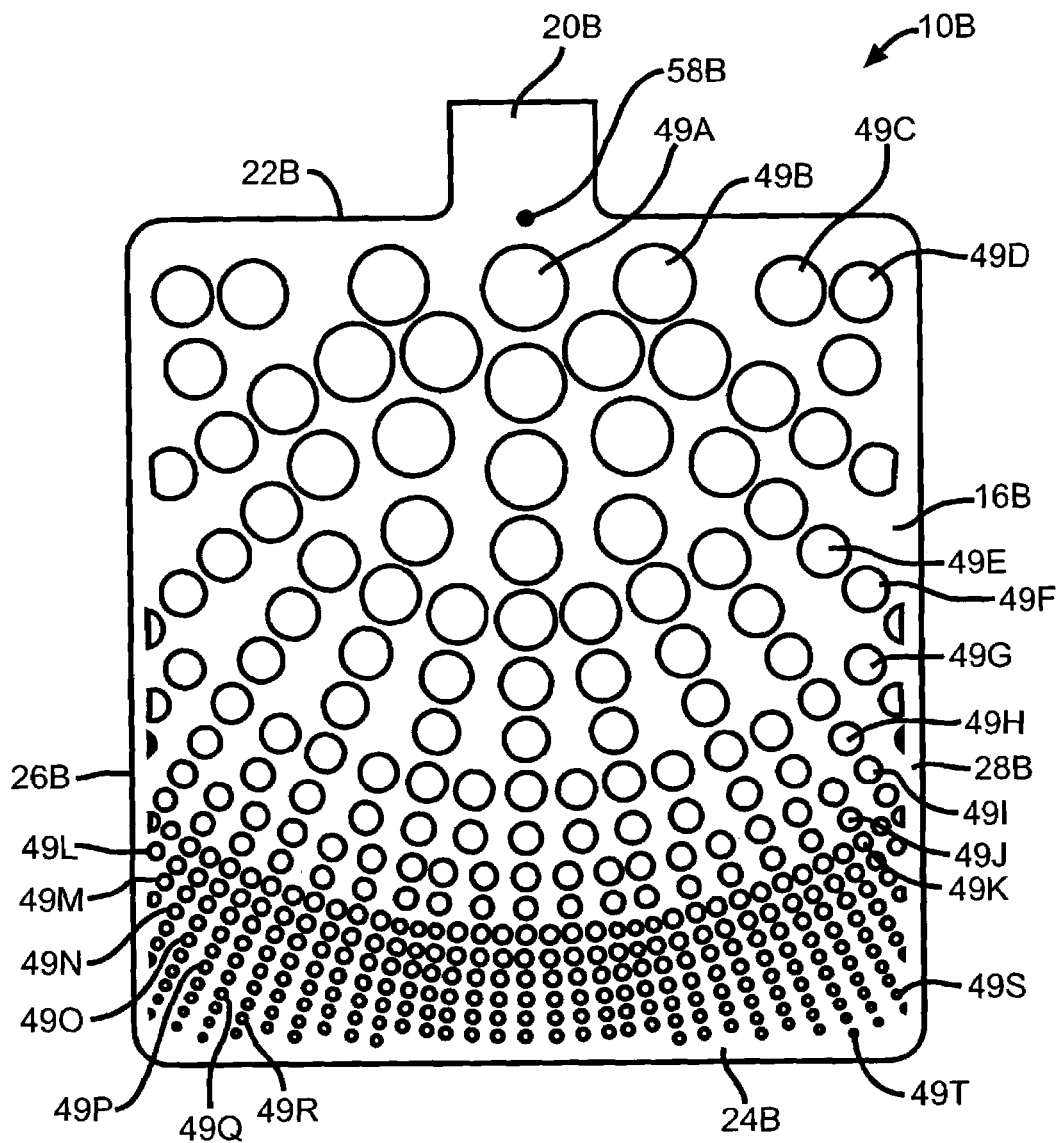
FIG. 1B is a plan view of another embodiment of a current collector 10B according to the present invention.
Figure 2:
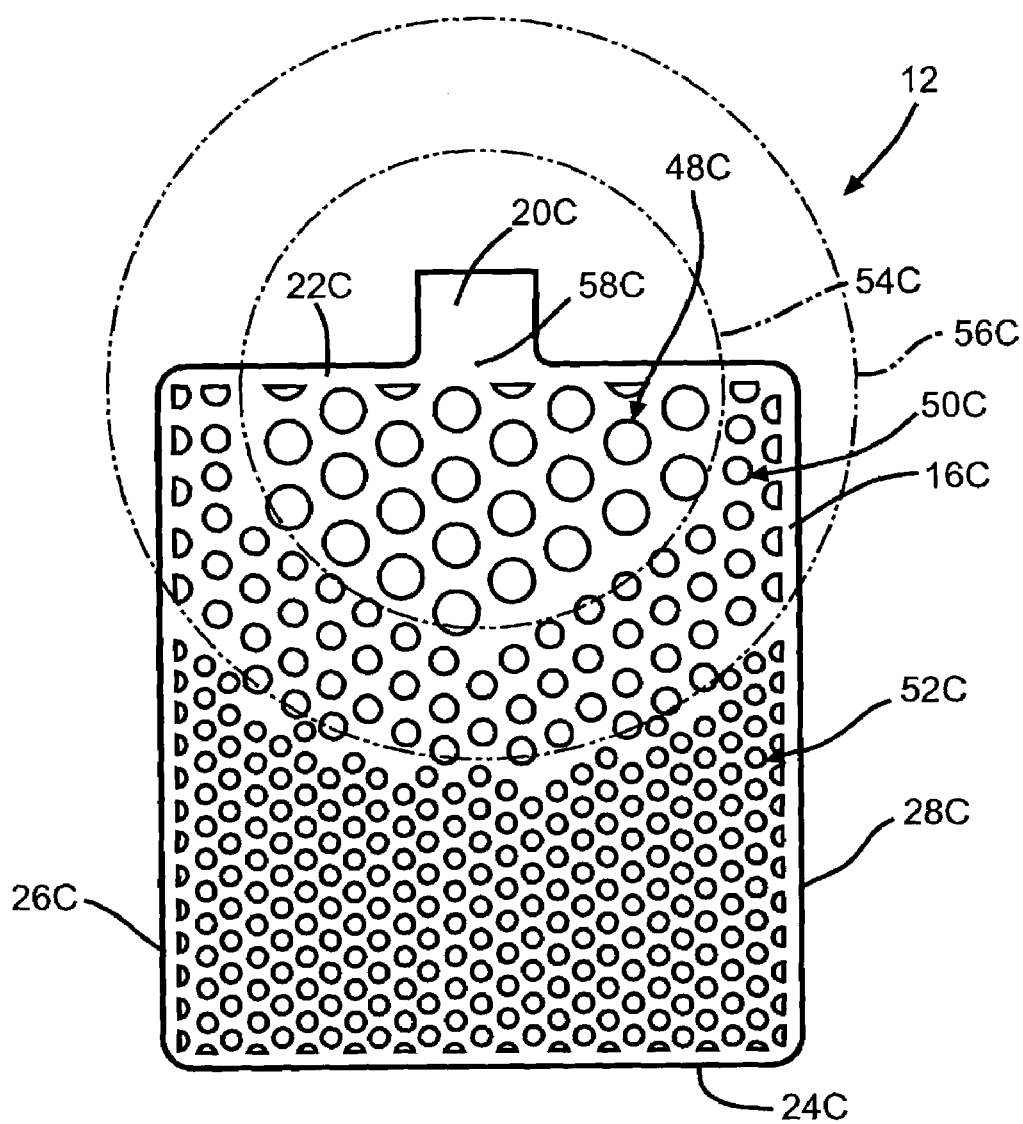
FIG. 2 is a plan view of another embodiment of a current collector 12 according to the present invention.
Figure 3:
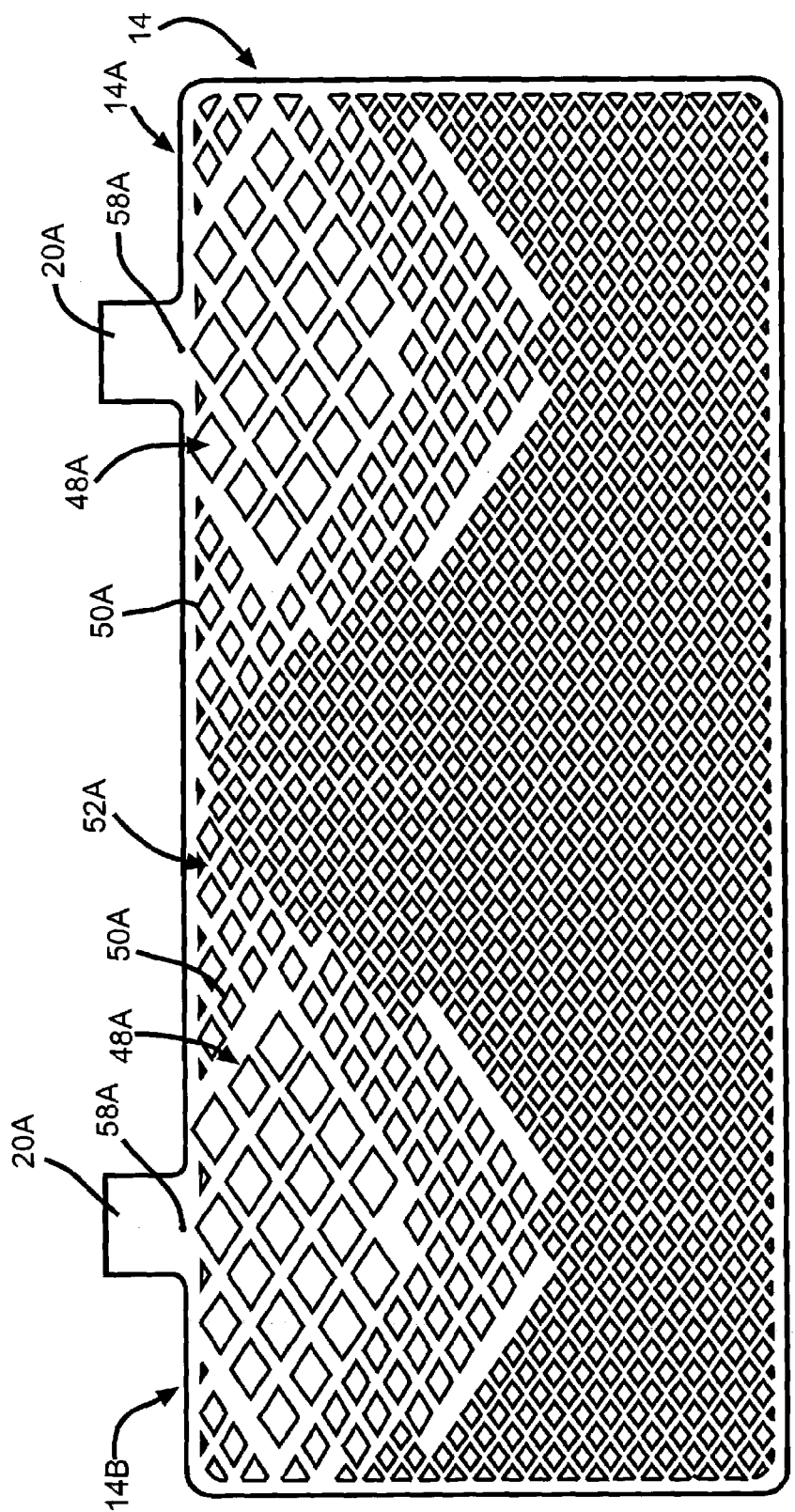
FIG. 3 is a plan view of a double winged current collector 14 according to the present invention.
Figure 4:
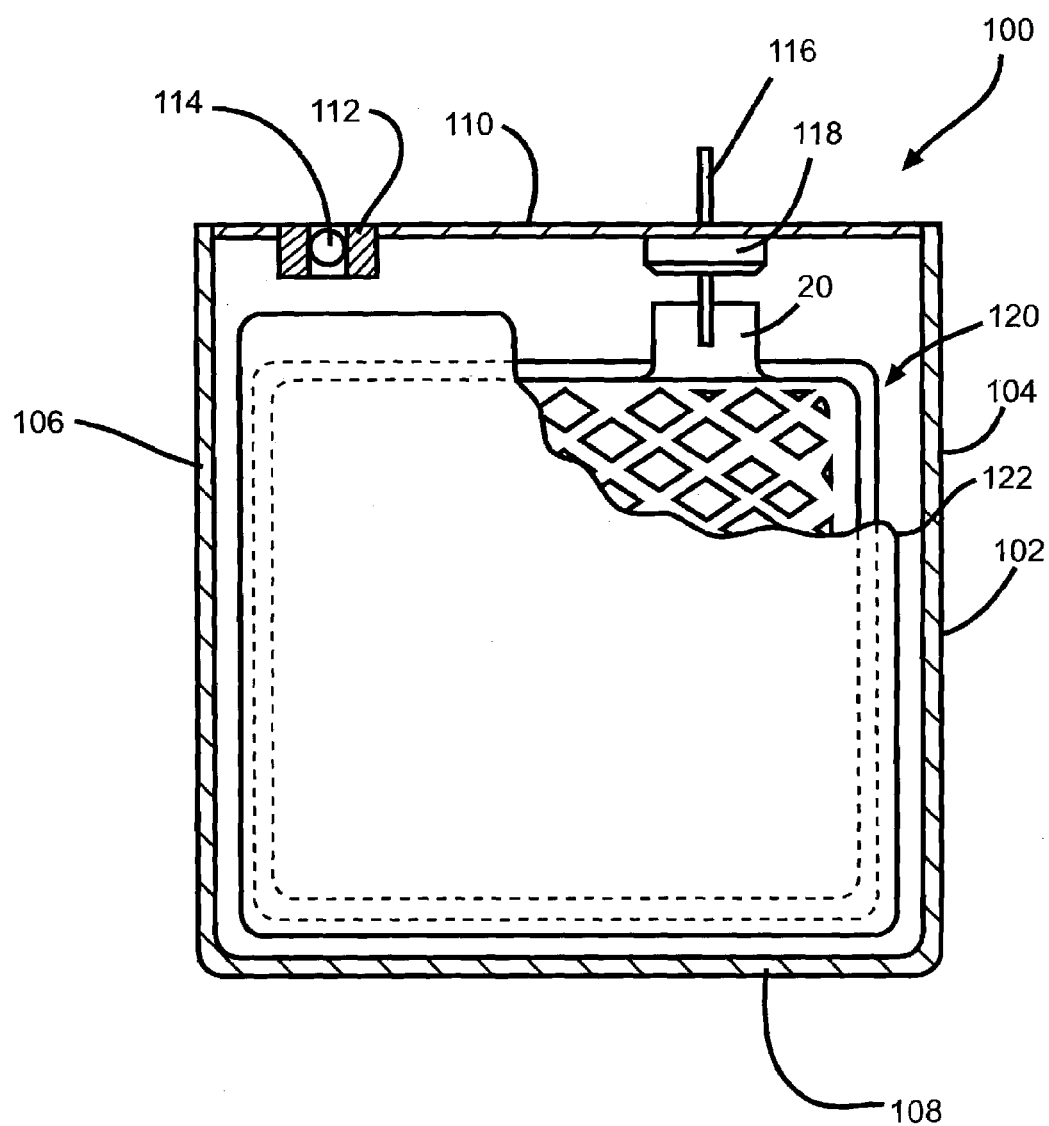
FIG. 4 is a side elevational view of the current collector 10 of FIG. 1 incorporated into an electrochemical cell 100.

Referring now to the drawings, FIGS. 1, 1A, 1B and 2 are views of various embodiments of "single wing" current collectors 10, 10A, 10B and 12, respectively, according to the present invention while FIG. 3 shows another embodiment of a current collector 12 having a double wing configuration. FIG. 4 is of an exemplary electrochemical cell 100 of a multi-plate configuration comprising one of the present current collectors. Whether the current collector of the cell 100 is of one of the single wing configurations 10, 10A, 10B and 12 or of the double wing type 14 is not necessarily important.

As shown in the enlarged view of FIG. 1, the current collector 10 is a relatively thin substrate comprised of wire or bar-shaped conductor strands in the shape of a frame 16 surrounding a grid 18 and supporting a tab 20. The conductors and tab are of a conductive material such as nickel, aluminum, copper, stainless steel, tantalum, cobalt and titanium, and alloys thereof. The frame 16 has spaced apart upper and lower strands 22 and 24 extending to and meeting with left and right strands 26 and 28. Upper frame strand 22 meets left frame strand 26 at curved corner 30, left frame strand 26 meets lower frame strand 24 at curved corner 32, lower frame strand 24 meets right frame strand 28 at curved corner 34, and right frame strand 28 meets upper frame strand 22 at curved corner 36.

Tab 20 is a generally solid planar member and extends outwardly from the upper frame strand 22 spaced substantially equidistant from the left and right frame strands 26, 28. Tab 20 includes left and right, sides 38 and 40 extending to and meeting with an intermediate edge 42. The tab sides 38 and 40 are parallel to each other and generally parallel to the left and right frame strands 26, 28. The tab sides 38 and 40 meet the upper frame strand at curved corners 44 and 46, respectively. If desired, however, the tab 20 can be spaced closer to either of the left or the right frame strand than the other.

The grid 18 is interior of and supported by the frame 16 and generally comprises a first region of openings 48, a second region of openings 50 and a third region of openings 52. Openings 48 are larger than openings 50, which, in turn, are larger than openings 48. A first transition zone (shown as dashed line 54) delineates the extent of the first openings 48. The area between the first transition zone 54 and a second transition zone (shown as dashed lines 56) delineates the area of the second openings 50. The region between the second transition zone 56 and a distal portion of the left and right frame strands 26 and 28 adjacent to the lower frame strand 24 delineates the area of the third openings 52.

As more particularly shown in FIG. 1, the first openings 48 are of a rectangular shape oriented with an apex pointed at each of the left and right frame strands 26, 28 and the upper and lower frame strands 22, 24. The first openings 48 propagate or extend from an imaginary focal point 58 on the tab 20 and are uniformly spaced throughout the area bordered by the upper frame strand 22 and the first transition zone 54. Triangular shaped openings 60 are provided at spaced intervals between the first openings 48 and the upper frame strand 22.

The second openings 50 are of a rectangular shape positioned in a similar orientation as the first openings 48.

As with the first openings, the second openings are uniformly spaced throughout the region bordered by the first transition zone intersecting the upper frame strand 22 and the second-transition zone 56 intersecting the left and right frame strands 26, 28. Triangular shaped openings 62 are provided at spaced intervals between the second openings 50 and the frame strands 22, 26 and 28.

The third openings 52 are also of a rectangular shape positioned in a similar orientation as the first and second openings 48, 50. The third openings are uniformly spaced throughout the region bordered by the second transition zone 56 and its intersection with the left and right frame strands 26, 28 and the lower frame strand 24. As before, triangular shaped openings 64 are provided at spaced intervals between the second rectangular openings 52 and the lower, left and right frame shaped strands 24, 26 and 28.

An important aspect of the present invention is the relationship between the regional extent of the first, large openings 48 to the intermediate sized second openings 50 to that of the smaller, third openings 52. If the distance from the focal point 58 to the first transition zone 54 is "x", then the distance from the first transition zone to the second transition zone 56 ranges from about 0.2x to about 10x. Also, the distance from the second transition zone 56 to the terminus of the third openings 52 ranges from about 0.2x to about 10x.

An important application of the present invention is use of the current collector 10 in a cathode electrode. During electrochemical cell discharge, electrons from the anode electrode travel through the load and are distributed to the cathode electrode to react with anode ions that have traveled directly through the separator to a reaction site on the cathode active material. It is important that these reactions occur uniformly throughout the cathode electrode, especially when the cathode active material has a higher resistivity than the current collector, such as silver vanadium oxide in a lithium cell (Li/SVO). Although current flow across the current collector is important, current flow across the cathode active material itself is critical because it has a greater impact on the even and uniform discharge of the anode and cathode electrodes. In other words, the transport of electrons to the cathode active material through the cathode current collector must be uniform for a cell to discharge at a constant rate, especially as end-of-life (EOL) discharge approaches. This is particularly the case when the current collector is provided with openings.

In a prior art current collector having openings of a fairly consistent size throughout, it is often seen that the anode material directly opposite or facing that portion of the cathode electrode proximate the tab reacts first. As discharge continues in a conventional cell design, anode material facing those portions of the cathode active material further and further from the cathode tab are reacted. Finally, anode material at the very outer reaches of the anode electrode and facing cathode active material most remote from the cathode tab is reacted. This results in non-uniform discharge, especially as EOL approaches when the cell is subjected to pulse discharge conditions in the Ampere range. An example is when the cell is used to power a cardiac defibrillator during device activation and the discharge is on the order of about 1 to about 4 amps. Non-uniform discharge is not so pronounced when the defibrillator is in a monitoring mode and current is on the order of about 1 microampere to about 100 microampere.

The unique structural configuration of the openings 48, 50 and 52 of the present current collector 10 prevents such non-uniform discharge. In those areas immediately proximate the current collector tab 20, where the prior art current collector first experiences the majority of its discharge reactions, the distance from the edge of the current collector pathways bordering an opening to the cathode active material at the opening's center is greater, for example opening 48, than in an opening of a smaller size, for example openings 50 and 62. Therefore, while the cathode active material contacting a conductive portion of the current collector and immediately adjacent thereto is readily reacted, the cathode active material further removed from the conductive current collector portions or pathways and closer to the center of any one opening is not so readily reacted. In the present invention, this means the greater distance the electron must travel to react with the cathode active material at the center of a larger opening 48 acts to counterbalance the rapid discharge of the cathode active material proximate the tab.

Accordingly, an electron reacting at a cathode active material site proximate the center of one of the relatively smaller openings 50 and 52 does not travel as far from the conductive pathways as in one of the larger openings 48. In this manner, the present current collector 10 promotes even and complete discharge of the cathode active material throughout the entire area of the cathode current collector, including those regions distal with respect to the tab 20.

FIG. 1 shows the transition zones between the various opening regions having a generally elliptical shape. This is not necessary. FIG. 1A shows a current collector 10A similar in construction to current collector 10 but having the rectangular shaped openings propagating or extending from focal point 58A on tab 20A to transition zones 54A and 56A of a partial circular shape. In other words, the transition zones 54A and 56A are of a generally fixed radius from the focal point 58A. In all other respects, current collector 10A is generally similar to current collector 10 of FIG. 1. For that reason, the parts of current collector 10A corresponding to those of current collector 10 have been given the same numerical designation, but with the "A" suffix.

In a broader sense, however, the transition zone need not have an elliptical or a circular shape. It can also have an irregular shape. Furthermore, current collectors 10 and 10A are shown having three distinct regions of openings propagating from the focal point 58. However, according to the present invention there are at least two regions of openings, but there can be more than three regions. In any event, as the regions of openings propagate from the focal point, the openings are of a progressively smaller size.

Another embodiment of the present current collector 10B has the openings having a gradual decrease in size as the distance from the tab increases. This is shown in FIG. 1B where the parts that are the same as those of current collector 10 are given the same numerical designation, but with the "B" suffix. The openings are designated 49A to 49T.

In a similar manner as the current collector 10A of FIG. 1A, current collector 12 of FIG. 2 is generally similar to the current collector 10 of FIG. 1 except the openings are circular instead of rectangular shaped. Also, the circular shaped openings propagate or extend from the focal point 58C on tab 20C to transition zones 54C and 56C having partial circular shapes. For that reason, the parts of current collector 12 corresponding to those of current collector 10 have been given the same numerical designations but with the "C" suffix.

It is also contemplated by the scope of the present invention that the openings need not necessarily be circular or rectangular. Instead, they can be of irregular shapes. They can also be of different shapes in the same current collector.

What is important is that the size of the majority of the openings in a first zone or region closest to the current collector tab are larger than the majority of the openings in a second region further from the tab than the first region. A majority is greater than 50%.

The double wing current collector 14 of FIG. 3 is essentially comprised of two current collector portions 14A and 14B, each similar to current collector 10A of FIG. 1A as mirror images of each other. The mirror image current collectors 14A, 14B are positioned side-by-side, connected together at the third rectangular-shaped opening 52A.

FIG. 4 shows the exemplary electrochemical cell 100 useful with any one of the current collectors 10, 10A, 12 and 14. For sake of clarity, the single wing collector 10 is shown.

The cell includes a casing 102 having spaced apart front and back side walls (not shown) joined by sidewalls 104 and 106 and a planar bottom wall 108. The junctions between the various side walls and bottom wall are curved. A lid 110 closes the open top of the casing 102. Lid 110 has an opening 112 that serves as a port for filling an electrolyte (not shown) into the casing after the cell's internal components have been assembled therein and lid 110 has been sealed to the side walls. In the final and fully assembled condition, a plug, such as a ball 114, is hermetically sealed in the electrolyte fill opening 112 to close the cell in a gas tight manner. The casing 102, lid 110 and sealing ball 114 are preferably of a conductive material. Suitable materials include nickel, aluminum, stainless steel, mild steel, nickel-plated mild steel and titanium. Preferably, the casing, lid and sealing ball are of the same material.

A terminal lead 116 for one of the anode electrode and the cathode electrode is electrically insulated from the lid 110 and the casing 102 by a glass-to-metal seal 118. In a case-negative cell configuration, the lead 116 serves as the cathode terminal and the lid 110 and casing 102 serve as the negative or anode terminal, as is well known to those skilled in the art. A case-positive cell configuration has the positive electrode or cathode contacted to the casing 102 with the anode supported on the current collector 10 connected to the lead 116.

In either case, the exemplary cell 100 shown in FIG. 4 includes a central electrode 120 comprising the current collector 10 of the present invention supporting at least one of the opposite polarity active materials. For the sake of clarity, the active materials are not shown supported on the current collector 10. However, in a case-negative cell configuration, current collector 10 supports opposed layers of cathode active material contacting the opposite major sides thereof locked together through its many openings. The tab 20 is then connected to the terminal lead 116 such as by welding. In a case-positive cell configuration, anode active material is locked together supported on the opposite major sides of the current collector.

The central electrode 120 of cell 100 is sealed in a separator envelope 122 to prevent direct contact with the opposite polarity electrode. While not shown in FIG. 4, in a case-negative design the opposite polarity electrode is the anode comprised of anode active material contacted to the inner major sides of the current collector 14 shown in FIG. 3. The wing portions 14A and 14B of collector 12 are then folded toward each other at about the mid-point of the third diamond-shaped opening 52A so that the tabs 20A line up with each other. In a case-positive cell configuration, the opposed cathode plates are carried by the wing portions 14A, 14B and folded toward each other and into electrical association with the opposed major sides of the central anode.

A more thorough and complete discussion of a cell construction having a current collector comprising wing-like portions that are folded into electrical association with a central electrode of an opposite polarity is shown in U.S. Pat. No. 5,312,458 to Muffoletto et al. This patent is assigned to the assignee of the present invention and incorporated herein by reference.

The cell 100 can be of either a primary or a secondary chemistry. A preferred primary electrochemical cell is of an alkali metal anode, such as of lithium, and a solid cathode active material. Exemplary cathode materials include silver vanadium oxide, copper silver vanadium oxide, manganese dioxide and fluorinated carbon ($CF_x$). An exemplary secondary cell has a carbonaceous anode and a lithiated cathode active material such as lithium cobalt oxide. In either type of cell chemistry, the activating electrolyte is of a nonaqueous nature.

It is appreciated that various modifications to the present inventive concepts described herein may be apparent to those of ordinary skill in the art without departing from the spirit and scope of the present invention as defined by the herein appended claims.

What is claimed is:

1. A current collector, which comprises:
   a) a substrate comprising at least one frame conductor providing a closed perimeter with an extending tab;
   b) a plurality of first openings uniformly spaced interior of the frame conductor in a first region of the substrate extending from the tab to a first transition;
   c) a plurality of second openings uniformly spaced interior of the frame conductor in a second region of the substrate extending from the first transition, wherein except for single openings that are only at a perimeter position intermediate one of the first and second openings located immediately adjacent to the frame conductor in each of the first and second regions, everyone of the first openings is larger than everyone of the second openings; and
   d) wherein there are n regions of openings from the tab to a farthest portion of the frame conductor perimeter with the openings in each region being uniformly spaced from each other and being smaller than everyone of the openings in the immediately preceding region toward the tab except for those openings located at the perimeter position immediately adjacent to the frame conductor in each of the n regions.

2. The current collector of claim 1 wherein n=two regions.

3. The current collector of claim 1 wherein n=more than two regions.

4. The current collector of claim 1 wherein the second openings in the second region extend to a second transition spaced from the tab further than the first transition and wherein the current collector further comprises a plurality of third openings uniformly spaced interior of the frame conductor in a third region of the substrate extending from the second transition to the frame conductor, wherein except for single openings that are only at a perimeter position intermediate one of the second and third openings located immediately adjacent to the frame conductor, everyone of the second openings is larger than everyone of the third openings in the third region.

5. The current collector of claim 4 wherein n=three regions.

6. The current collector of claim 4 wherein the third openings are at a greater distance from the tab than the second openings which, in turn, are at a greater distance from the tab than the first openings.

7. The current collector of claim 4 wherein the tab has an imaginary focal point and a first distance from the focal point to the first transition is of an x length such that a second distance from the first transition to an end of the second openings ranges from about 0.2x to about 10x and wherein a third distance from the second transition to an end of the third openings ranges from about 0.2x to about 10x in length.

8. The current collector of claim 1 wherein the first transition forms either a circular or an elliptical arch with the tab.

9. The current collector of claim 1 wherein the first and second openings are of either a rectangular or a circular shape.

10. The current collector of claim 1 wherein the tab is either centered or offset along the at least one frame conductor.

11. The current collector of claim 1 wherein the substrate has a generally rectangular shape.

12. The current collector of claim 1 wherein the tab has an imaginary focal point and a first distance from the focal point to the first transition is of an x length such that a second distance from the first transition to an end of the second openings ranges from about 0.2x to about 10x in length.

13. The current collector of claim 1 of a conductive material selected from the group consisting of nickel, copper, titanium, cobalt, tantalum, aluminum, stainless steel, and alloys thereof.

14. A current collector, which comprises:
a) a substrate comprising at least one frame conductor providing a closed perimeter;
b) a plurality of first openings uniformly spaced interior of the frame conductor in a first region of the substrate interior of the frame conductor and extending from a tab to a first transition spaced from the tab;
c) a plurality of second openings uniformly spaced interior of the frame conductor in a second region of the substrate and extending from the first transition to a second transition spaced from the tab further than the first transition; and
d) a plurality of third openings uniformly spaced interior of the frame conductor in a third region of the substrate and extending from the second transition to the perimeter of the frame conductor, wherein except for single openings that are only at a perimeter position intermediate one of the first, second and third openings located immediately adjacent to the frame conductor, everyone of the first openings is larger than everyone of the second openings which are larger than everyone of the third openings.

15. The current collector of claim 14 wherein the first, the second and the third openings radiate outwardly from an imaginary focal point residing on the tab.

16. The current collector of claim 15 wherein the first and the second transitions form either a circular or an elliptical arch with the focal point.

17. The current collector of claim 14 wherein the first, the second and the third openings are of either a rectangular or a circular shape.

18. The current collector of claim 14 wherein the frame has a rectangular shape.

19. The current collector of claim 14 wherein the tab has an imaginary focal point and a first distance from the focal point to the first transition is of an x length such that a second distance from the first transition to an end of the second openings ranges from about 0.2x to about 10x and wherein a third distance from the second transition to an end of the third openings ranges from about 0.2x to about 10x in length.

20. A current collector, which comprises:
a) a substrate comprising at least one frame conductor providing a closed perimeter,
b) a tab extending from the frame conductor and intended for connection to a terminal lead; and
c) a plurality of openings in the substrate extending from the tab to a distal portion of the frame conductor, the openings having a size gradient such that the size of the openings in zones progressing outwardly from the tab are of equal size in each zone and of a gradually decreasing size as the distance from the tab increases except for openings that are only located at a position immediately adjacent to the frame conductor.

21. A method for providing an electrochemical cell, comprising the steps of:
a) providing a current collector comprising:
i) a substrate comprising at least one frame conductor providing a closed perimeter with a tab;
ii) a plurality of first openings uniformly spaced interior of the frame conductor in a first region of the substrate extending from the tab to a first transition;
iii) a plurality of second openings uniformly spaced interior of the frame conductor in a second region of the substrate extending from the first transition, wherein except for single openings that are only at a perimeter position intermediate one of the first and second openings located immediately adjacent to the frame conductor in each of the first and second regions, everyone of the first openings is larger than everyone of the second openings; and
iv) wherein there are n regions of openings from the tab to a farthest portion of the frame conductor perimeter with the openings in each region being uniformly spaced from each other and being smaller than everyone of the openings in the immediately preceding region toward the tab except for those openings located at the perimeter position immediately adjacent to the frame conductor in each of the n regions; and
b) contacting a first electrode active material to at least one of a first and second major sides of the current collector having its frame conductor connected to a first terminal to provide a first electrode;
c) electrically associating the first electrode with a second counter electrode connected to a second terminal and housed inside of a casing; and
d) activating the first and second electrodes with an electrolyte.

22. The method of claim 21 including providing the first and second openings radiating outwardly from an imaginary focal point on the tab of the frame conductor.

23. The method of claim 22 including the first transition forming either a circular or an elliptical arch with the focal point.

24. A method for providing an electrochemical cell, comprising the steps of:
a) providing a current collector comprising:
i) a substrate comprising at least one frame conductor providing a closed perimeter and a tab extending outwardly from the frame conductor;
ii) a plurality of first openings uniformly spaced interior of the frame conductor in a first region of the substrate interior of the frame conductor and extending from the tab to a first transition spaced from the tab;

iii) a plurality of second openings uniformly spaced interior of the frame conductor in a second region of the substrate interior of the frame conductor and extending from the first transition to a second transition spaced from the tab further than the first transition; and iv) a plurality of third openings uniformly spaced interior of the frame conductor in a third region of the substrate extending from the second transition to the perimeter of the frame conductor, wherein except for single openings that are only at a perimeter position intermediate one of the first, second and third openings located immediately adjacent to the frame conductor, everyone of the first openings is larger than everyone of the second openings which are larger than everyone of the third openings;

b) contacting a first electrode active material to at least one of a first and second major sides of the current collector having its tab connected to a first terminal to provide a first electrode;

c) electrically associating the first electrode with a second counter electrode connected to a second terminal and housed inside of a casing; and d) activating the first and second electrodes with an electrolyte.

25. The method of claim 24 including providing the first, the second and the third openings radiating outwardly from an imaginary focal point on the tab.

26. The method of claim 25 including the first and the second transitions forming either a circular or an elliptical arch with the focal point.

27. A current collector, which comprises:
a) a substrate comprising at least one frame conductor providing a closed perimeter with an extending tab; and
b) a plurality of openings in the substrate interior of the frame conductor, wherein there are n regions of openings from the tab to a farthest portion of the frame conductor perimeter with the openings in each region being uniformly spaced from each other and being smaller than everyone of the openings in the immediately preceding region toward the tab except for openings that are only at a perimeter position immediately adjacent to the frame conductor in each of the n regions.

28. The current collector of claim 27 wherein n=two or more regions.

* * * * *